Oct. 18, 1927.
A. E. EBAUGH
1,646,055
EXTENSIBLE AND CONTRACTIBLE BUMPER FOR VEHICLES
Filed Jan. 15, 1927　　2 Sheets-Sheet 2
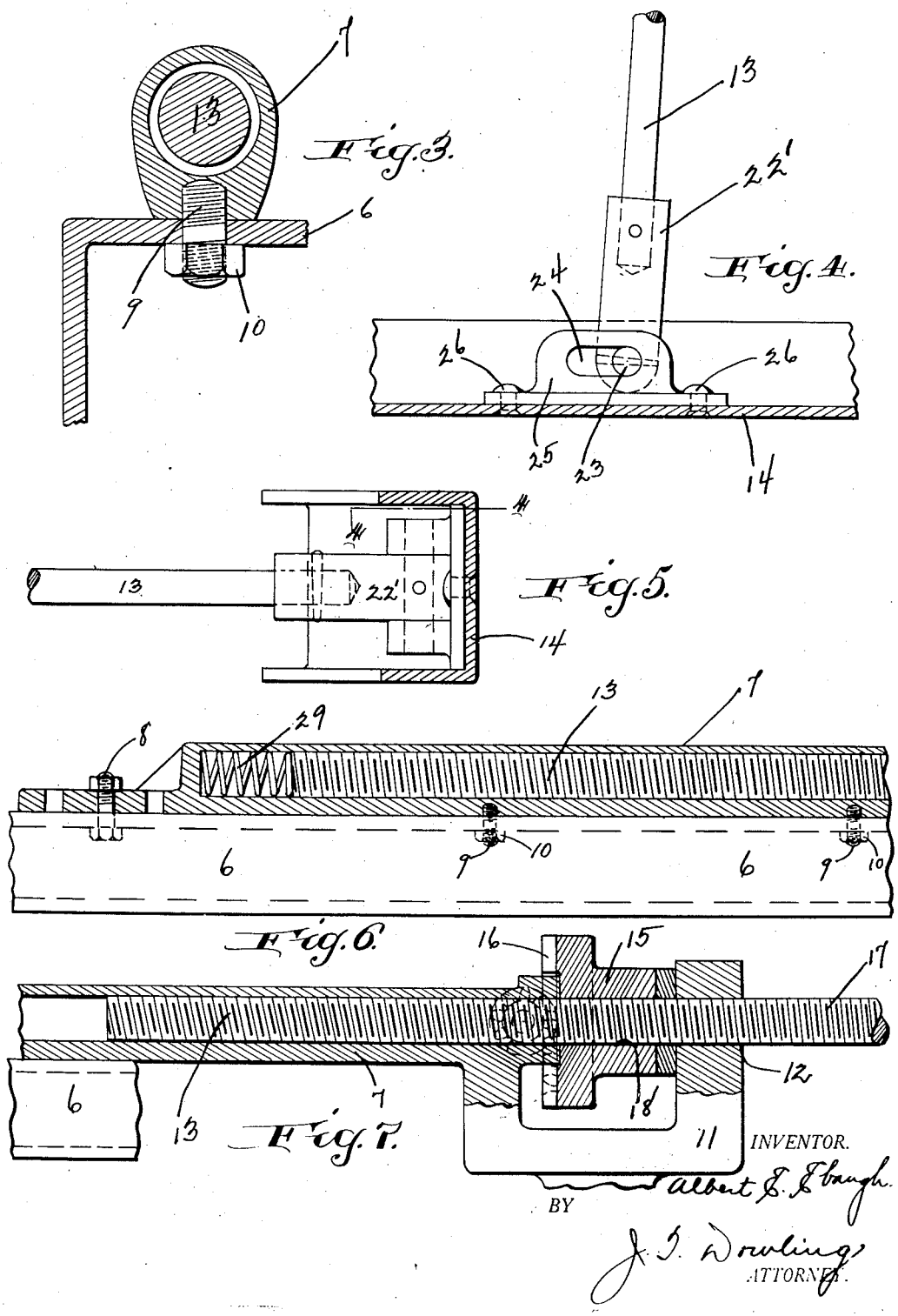

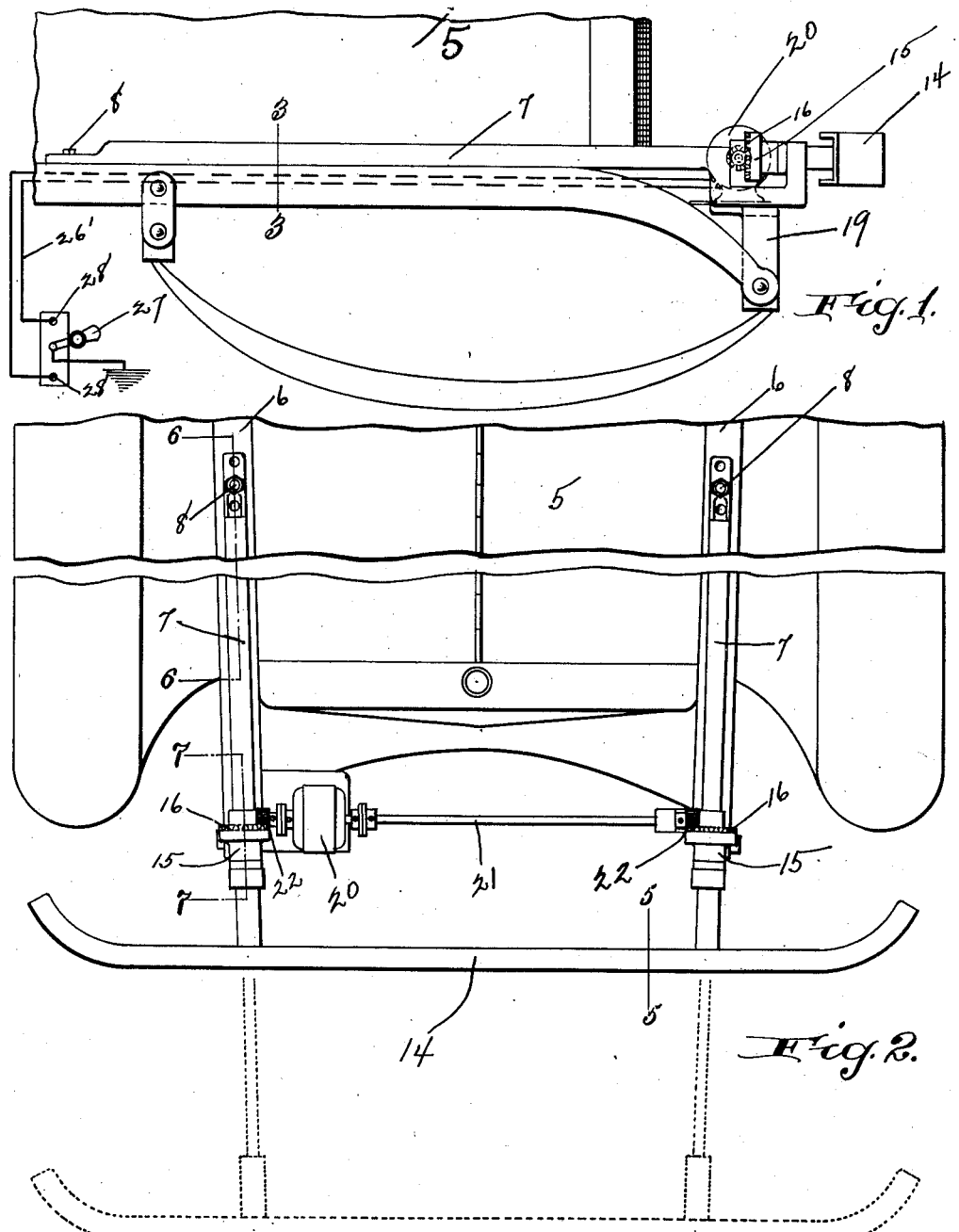

Patented Oct. 18, 1927.

1,646,055

UNITED STATES PATENT OFFICE.

ALBERT E. EBAUGH, OF BALTIMORE, MARYLAND.

EXTENSIBLE AND CONTRACTIBLE BUMPER FOR VEHICLES.

Application filed January 15, 1927. Serial No. 161,305.

My invention relates to certain improvements in extensible bumpers for vehicles, and has for its particular object the provision of a bumper which can be extended or contracted at the will of an operator.

It is a well known fact that in the use of present type bumpers, due to limited parking space and congested parking areas, that once a machine is parked the adjacent cars, both at the rear and forward part of the parked machine, make it almost impossible to move the parked machine until the adjacent cars have been moved. To overcome this serious objection is the aim of the present invention, namely, the provision of a bumper capable of being extended or contracted for the purpose of determining a predetermined distance between parked machines.

A further object of this invention is the provision of an extensible and contractible bumper for motor vehicles, whereby said vehicles to which the bumper is attached may be parked and their bumpers extended so as to determine the distance between the parked vehicle and adjacent vehicles, thereby always assuring sufficient distance between parked vehicles that each may be moved.

A still further object of this invention is the provision of novel means whereby said bumpers, either at the rear or front of a machine, or at both ends thereof, may be extended or contracted at the will of an operator.

A still further object of the invention is the provision of an extensible and contractible bumper capable of being mounted to a motor vehicle and equipped with means whereby it may be operated either manually or automatically.

With these and other objects in view, the invention consists in certain novel features, combination and arrangement of parts as will be hereinafter more fully described, illustrated in the accompanying drawings, and claimed.

In the drawings,

Figure 1 is a fragmentary side elevational view of a motor vehicle equipped with my improved extensible bumper, illustrating diagrammatcally an operating means therefor;

Figure 2 is a fragmentary top plan view of my improved bumper, illustrating the same attached to a motor vehicle, showing the same extended in dotted lines;

Figure 3 is an enlarged transverse sectional view taken on the line 3—3 of Figure 1;

Figure 4 is a transverse sectional view taken on the line 4—4 of Figure 5;

Figure 5 is a transverse sectional view taken on the line 5—5 of Figure 2;

Figure 6 is a transverse longitudinal sectional view taken on the line 6—6 of Figure 2; and, Figure 7 is a longitudinal transverse sectional view taken on the line 7—7 of Figure 2.

Referring to the drawings, the numeral 5 indicates a motor vehicle having the usual chassis frame consisting of side bars 6, upon which side bars are mounted tubular casings 7 of my improved extensible bumper. The casings 7 are adjustably secured to the side bars 6 by means of fastening elements 8, such as bolts, nuts, or the like. They are further fastened to the bars 6 by the use of stud bolts 9 having secured to their free ends, nuts 10. The forward ends of the casings 7 terminate in U-shaped brackets 11, the outer arms of which constitute journals 12.

Slidably mounted in the casing 7, are threaded bars 13, on the outer ends of which is pivotally secured a bumper bar 14. The threaded bars 13 extend through the journals 12 of the casings 7 and have threaded thereon, bushings 15, the inner faces of which are provided with gear teeth 16. The bushings 15 are rotatable on the bars 13 by virtue of having intermeshing threads 17 and 18, respectively, the purpose of which will be hereinafter more fully described.

A bracket 19 is secured to the terminal of one of the side bars 6, and this bracket supports a motor 20, which motor drives a transverse shaft 21, on the opposite ends of which shaft are secured pinions 22, the teeth of which mesh with the teeth 16 of the bushings 15, and when the motor is rotated the bars 13 are either extended forwardly from the casings 7 or are drawn into the casings 7, depending upon the direction in which the motor is turned.

To compensate for the converging of the outer ends of the frame bars 6 of the chassis, the bars 13 have pivoted to their outer ends sleeves 22', which in turn have their outer ends pivoted, as at 23, in a slot 24 carried by a bracket 25 secured as at 26, to the inner side of the bumper bar 14.

The motor 20 is reversible and is illustrated electrically operated diagrammatically in Figure 1, through the wiring 26', switch 27, and contact points 28 and 28'.

It will be readily understood when the switch is closed and the motor rotated, that the shaft 21 will rotate, rotating pinions 22, which, meshing with teeth 16 of bushings 15, control the movement of the bumper bar 14, by virtue of the meshing of the teeth 17 of the bars 13, with the teeth 18 of the bushings 15.

To hold the bars 13 against vibration, I provide a coil spring 29 in each casing 7 at the inner end thereof, and this coil spring has contact with the bars 13 and holds them against lateral displacement in any direction, thus eliminating any possible vibration of the bars in the casings 7.

It is further understood that certain minor features and changes may be made without departing from the spirit and scope of the invention as claimed.

Having thus described my invention, what I claim as new is:

1. An extensible and contractible bumper for vehicles, including casings, bars mounted in said casings, a bumper secured to the outer ends of said bars, bearings supporting said bars, a geared bushing surrounding each of said bars, and means meshing with said geared bushings whereby said bars may be contracted or extended with relation to the casings.

2. An extensible bumper for vehicles, including casings having their outer ends terminating in bearings, threaded bars mounted in said casings, threaded bushings surrounding said bars and located at the bearing end of said casings, gears formed on said bushings, and means meshing with said geared bushings whereby said bars may be moved out of and into said casings.

3. An extensible bumper for vehicles, including casings adapted to be secured to supports, said casings having their outer ends terminating in bearings, threaded bars mounted in said casings, bushings rotatably mounted on said bars and having intermeshing threads, said bushings located in the bearings of said casings, and means meshing with said bushings for controlling the movements of said bars relative to said casings.

4. An extensible bumper for vehicles, including casings, means for adjustably securing the casings to a support, brackets formed on the outer terminals of said casings, bars mounted in said casings, a bumper bar secured to the outer ends of the bars, geared bushings rotatably mounted on said bars at the bracket end of said casings, gears formed on said bushings, and means meshing with said gears for controlling the movement of said bars into and out of said casings.

5. An extensible bumper for vehicles, including casings, means for adjustably securing the casings to the vehicles, threaded bars mounted in said casings, journals formed on the terminals of said casings, threaded bushings mounted on said bars and located in said journals, gears formed on said bushings, means for rotating said bushings, and means for controlling the movement of said first named means whereby said bars may be moved into or out of said casings.

In testimony whereof he hereunto affixes his signature.

ALBERT E. EBAUGH.